(12) United States Patent
Viaud

(10) Patent No.: US 6,729,118 B2
(45) Date of Patent: May 4, 2004

(54) NON-STOP LARGE ROUND BALER

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 15 days.

(21) Appl. No.: 10/159,355

(22) Filed: May 31, 2002

(65) Prior Publication Data

US 2002/0184869 A1 Dec. 12, 2002

(30) Foreign Application Priority Data

Jun. 6, 2001 (DE) .......................... 011 12 928

(51) Int. Cl.⁷ .............................. A01D 75/00; B30B 9/00
(52) U.S. Cl. .......................................... 56/341; 100/88
(58) Field of Search .............................. 56/341; 100/88

(56) References Cited

U.S. PATENT DOCUMENTS

| | | | | |
|---|---|---|---|---|
| 3,895,573 A | * | 7/1975 | Phillips et al. ................. | 100/88 |
| 4,062,172 A | | 12/1977 | Rice ............................... | 56/343 |
| 4,259,900 A | * | 4/1981 | Campbell et al. ............. | 100/88 |
| 4,262,478 A | | 4/1981 | Pentith ........................... | 56/341 |
| 4,334,467 A | | 6/1982 | Nishibe ......................... | 100/89 |
| 4,534,285 A | | 8/1985 | Underhill ...................... | 100/88 |
| 4,625,502 A | * | 12/1986 | Gerhardt et al. .............. | 56/341 |
| 4,667,592 A | | 5/1987 | Pentith et al. ................. | 100/88 |
| 5,136,831 A | | 8/1992 | Fell ................................ | 56/341 |
| 5,289,672 A | * | 3/1994 | Underhill ...................... | 53/587 |
| 5,450,704 A | | 9/1995 | Clostermeyer ............... | 53/118 |
| 5,819,643 A | * | 10/1998 | McIlwain et al. ............. | 100/43 |

FOREIGN PATENT DOCUMENTS

| | | | | |
|---|---|---|---|---|
| DE | A1- 28 48 777 | 5/1980 | ................... | 56/341 |
| DE | A1- 39 20 377 | 1/1991 | ................... | 56/341 |
| EP | A1- 0 064 117 | 11/1982 | ................... | 56/341 |
| FR | 2591849 | * 12/1985 | ................... | 56/341 |
| GB | 2137925 | * 10/1984 | ................... | 100/88 |

* cited by examiner

*Primary Examiner*—Thomas B. Will
*Assistant Examiner*—Alicia Torres

(57) ABSTRACT

A non-stop, large round baler is provided with transversely spaced side walls having peripheries which are not connected to any structure or to the chassis and mounted so as to be adjusted transversely to increase or decrease the width of a bale forming chamber formed between them. Furthermore flexible bale forming elements are trained over rolls carried on the free end of revolving arms mounted outside the side walls, the rolls moving along the periphery of the side walls so as to define between them separate expansible chamber sections permitting one chamber section to begin filling with oncoming crop while the other chamber is being emptied of a completed bale.

20 Claims, 15 Drawing Sheets

NON-STOP LARGE ROUND BALER

FIELD OF THE INVENTION

This invention relates to a round baler having a set of flexible bale forming elements, useful to form two bale forming chamber sections between side walls and trained over fixed and moveable rolls having at least one conveyor acting with the bale forming elements to cover substantially the circumference of at least one of the bale forming chamber sections and having rotatable arms to carry some of the moveable rolls.

BACKGROUND OF THE INVENTION

EP-A1-0 064 117 discloses a round baler formed as a so-called non-stop baler. This round baler provides an upstream bale chamber and a downstream bale chamber surrounded by an upper and a lower conveyor. The upper conveyor comprises a single set of belts routed side-by-side over a series of fixed and moveable rolls. Three major moveable rolls are carried on a rotatable carrier at three equidistant locations. The spans of the belts between the major rolls are moved with the carrier from the front to the rear and form part of the bale chambers. A gate is provided in which rolls are kept in fixed positions to guide another run of the belts.

The problem to be solved with respect to this prior art baler is the limitation of the bale diameter by the distance between the major rolls. Another problem is the complexity of this design due to the high number of rolls needed in total. Yet another problem is the need to rotate the carrier inside the bale chamber which requires to double the side walls with discs to support the rotating rolls, as simple arms would interfere with the bale. More uncertain even is the transfer of the bale from one belt span to the next during the process.

SUMMARY OF THE INVENTION

According to the present invention, there is provided an improved arrangement for supporting flexible bale-forming elements of a non-stop, large round baler.

An object of the invention is to provide an arrangement for supporting flexible bale-forming elements including moveable arms mounted so as to permit relative movement between their respective free ends such as to allow them to reach large bale diameters, at least in the bale chamber concluding the bale cycle, whereas the bale chamber acting as an auxiliary bale chamber may be kept small.

A more specific object of the invention is to arrange the arms such that the segment of the flexible bale-forming elements that span between adjacent rolls supported by the arms creates a loop which will form a chamber surrounding a substantial portion of the forming bale in a much simpler way than using a multitude of rolls to provide walls of a bale chamber. Furthermore, the density reached with a loop around a bale is much higher than that reached with spans covering the bale only partially. The flexible bale forming elements may consist of belts or chains and slats.

Yet another object of the invention is to provide a bale chamber defined in part by opposite side walls, the periphery of which is not connected to surrounding structure, such as to allow the moveable rolls to move outside the bale chamber. In such a design the side edges of the belts or other flexible bale forming elements come quite close to the inner face of the side walls and, thus, avoid losses of crop and plugging problems. Furthermore, this feature enables the side walls to be moved laterally, so as to either change or adjust the friction between a bale and the side walls and/or to change the width of a bale formed in the bale chamber.

Although it is possible to have the arms inside the bale chamber, arms rotating outside the bale chamber are simple to control, avoid friction, (since no crop can squeeze between them and the side wall), and have freedom to move and allow the moveable rolls to be mounted so as to extend beyond the side walls. Arms moving through the space between the side walls would need to be journalled on a bearing outside the periphery of the side walls and should be extendable to a larger extent than arms being journalled within the periphery of the side walls.

Rolls extending beyond the side walls allow the width of the bale chamber to be selectively increased. Side walls which can be moved laterally, i.e., in the direction of the width of the round baler, enable making bales of different width or the friction between the walls and bale to be reduced when ejecting the bale.

The size and location of the bale chambers as well as the tension in the bale forming elements can be controlled, if the arms are formed of multiple parts which are adjustable with respect to each other by means of a power actuator. For example, the arms may be lengthened or shortened, tilted, bent or the like, to guide the rolls over which the bale forming elements are trained in a certain pattern.

One way to adjust the effective length of the arms is to connect its parts like a telescope, e.g., one part may be in the form of a tube, with another part being slidably received in the first part.

Another way to change the arms is to connect its parts in a joint, which allows the various parts of the arms to assume a position which brings the moveable rolls to the place necessary to create the one or other bale forming chamber.

Individual drives for each arm allow them to be positioned independently of each other and for electronic controls to be used to determine their position. Such drives may exist in belt or chain drives, in mechanical transmissions, including planetary gears, hydraulic drives, etc., and are controlled depending on the size of the bale, the operation step it currently undergoes, etc.

While it would be possible to change the position of the arms according to a control device without any feed-back signals, it is more sophisticated to use sensors to constantly compare the relationship between the size of the bale and the position of the arms. This feature allows the bale to be well surrounded by the belts and to eliminate excessive tension in the belts and the parts carrying them.

One way to make use of the signals emitted by the sensors is to feed them into a hardware electric circuit. More flexibility is obtained though by using a controller based on software, since it is more simple to react to different situations and to activate the power actuators accordingly.

The number of parts involved is kept low and the relationship between the arms and the sidewalls remains unchanged, if the part connecting the side walls to the chassis and the part bearing the arms is the same, namely an axle. This axle may comprise a strong and rigid tube withstanding the bending and torsion forces applied on it. Since this tube does not obstruct the path in which the arms move, it may have a considerable diameter, like 0.5 m, which is sufficient to support the load.

Rotating all arms about the same axis avoids a conflict between one arm and the axle on which another arm is journalled or with the other arm itself.

Filler plates between the lower edge of the side walls are helpful to avoid crop losses and to keep the shape of the bale uniform. Furthermore, they avoid friction of the bale side faces when they slide over the edge of the side wall.

In order to facilitate the movement of the arms through the gap between the lower edge of the side walls and the bottom conveyor, the filler plates are moveable too. One manner in making the filler plates moveable is to construct them in sections, with certain sections of the filler plates being moveable outwardly and inwardly with respect to the side walls so as to let the rolls and arms pass by. Another way would be to move the filler plate sections along and together with the arms and also to move them from the rear to front in a revolving cycle. Whichever solution is chosen, the position of the arms is used in controlling the position of the filler plates or of its sections.

Since the shape and the size of the side walls is determined by the location and size of the round bales produced between them, the rolls supported between the free ends of the arms guide the bale forming elements along respective portions of the edges of the side walls. Thus the periphery of the side walls is an excellent place to provide a track for the rolls or the arms. The periphery may by provided with covered or uncovered rails, tracks or the like for that purpose. Alternatively the track, for example a bent, profiled or formed rail, tube, carrier or the like may be attached rigidly to the side wall.

Three arms are an efficient number to support rolls having flexible bale forming elements extending between them for creating two bale forming loops between them.

While one roll at the end of each set of arms may be sufficient to carry the flexible elements, such as belts, and while three or more rolls may be used to control the movement of the bale forming elements, two rolls are appropriate to guide and carry the elements, and, depending on the radial distance between them, are helpful to determine the distance of the loops for forming the bale chambers.

If one bottom conveyor is assigned to each bale forming chamber, i.e., underneath the bale forming elements in the front and the rear, each of them may be designed according to its functions. Whereas a rear bottom conveyor only has to cover the bottom end of the bale forming chamber, the front bottom conveyor has to assist in the start of the bale. For this reason, the bottom conveyor immediately downstream of a pick-up assembly is inclined upwardly and forms a wedge with a span of the bale forming elements.

One means to provide for the proper tension in the bale forming elements which provides for a good tracking and a high density in the bale is to have at least one moveable roll on an arm applied by a biasing force. The biasing force may come from a spring, a hydraulic circuit, a pressure vessel or the like.

Such a new round baler is useful also to tie or wrap a produced bale if a wrapping or tying mechanism is provided near the downstream bale chamber to feed net, plastic or twine between the rear bottom conveyor and the bale forming elements.

The density of the crop may be increased and the quality may be improved if the crop is cut by using a cutting means, since this allows a higher compaction.

Flexing of the side walls can be limited or decreased if a support is used, which provides for a rigid connection between the chassis and the side walls. Such support can be a link, a hydraulic actuator or the like.

Another way to avoid an outward bending of the sidewalls under high pressing forces is the use of stops on the rolls, the arms carrying them or a brace bridging the arms, which stops slide or roll along the outside of the side walls and restrain them from bending outwardly.

One alternative way to control the movement of the rolls on the arms is to use a track, which controls the movement of that part of the arm, which carries the rolls.

While conventionally the flexible bale forming elements are arranged above a bottom conveyor or above a pick-up assembly, this is not absolutely necessary. It is possible too, to feed a bale forming chamber between bale forming elements also from the top. This would provide for a longer path between the pick-up assembly and the inlet for crop processing, like cutting and adding additives, and it would be easier to carry the weight of the bale. Reference is made also to already existing machines having the feeding on the top.

Using the existing pick-up assembly to close the bale forming chamber just being fed at the bottom, render another bottom conveyor superfluous. Thus cost savings and a higher reliability may be achieved.

There are two ways to close the bale forming chamber, which is currently fed, by means of the pick-up assembly. One is to move the inlet of the bale forming chamber to a location above the pick-up assembly. Another is to move the pick-up assembly accordingly. Movement may be accomplished by using hydraulic motors and tracks, links or the like.

BRIEF DESCRIPTION OF THE DRAWINGS

The drawing shows two embodiments of the invention explained in the description below, whereas it is shown in.

DESCRIPTION OF THE PREFERRED EMBODIMENT

Figure 1:
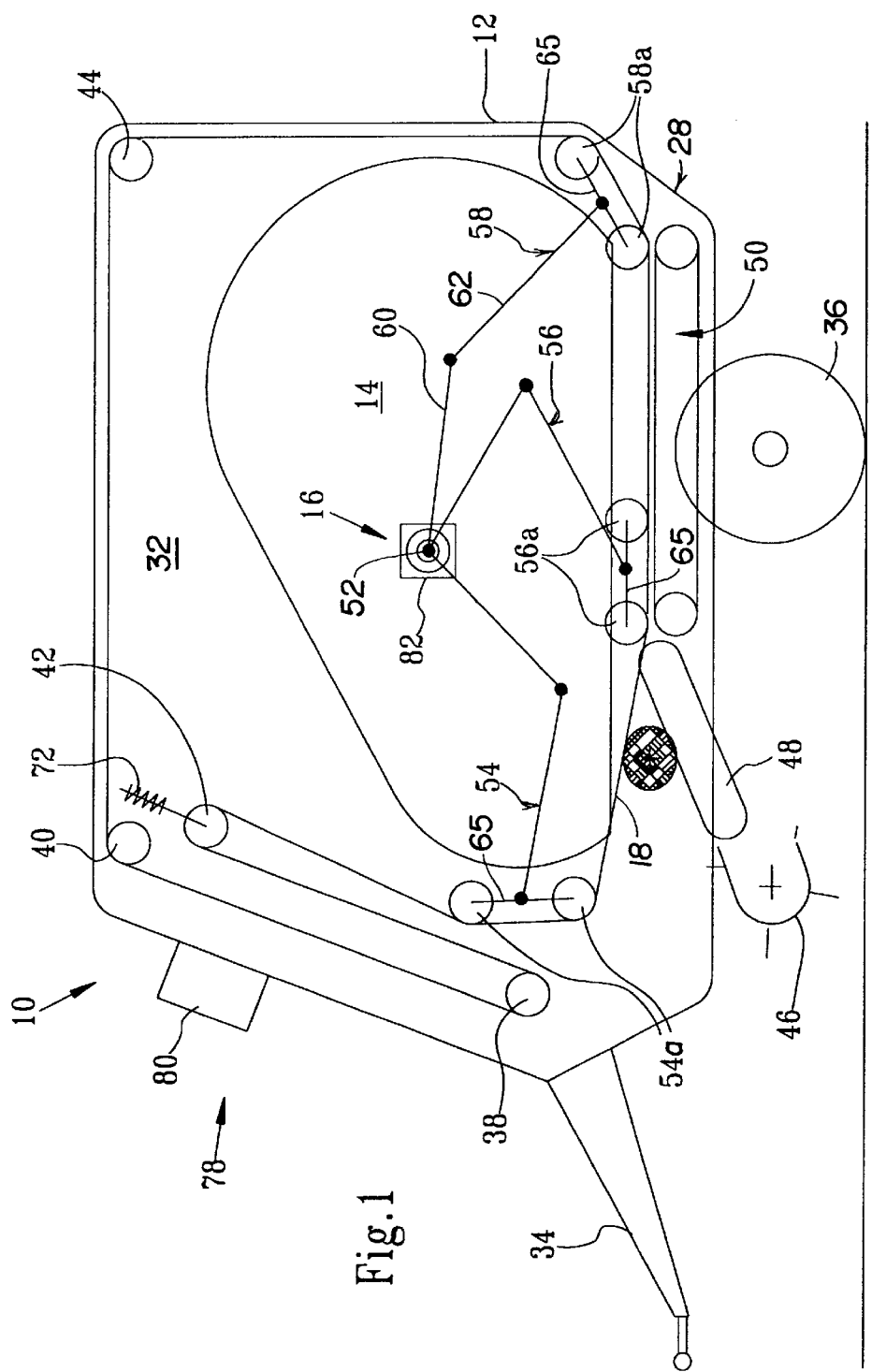
FIG. 1 is a schematic left side depiction of an empty large round baler constructed in accordance with a first embodiment.

A first embodiment of the invention is illustrated in FIGS. 1–7 and includes a round baler 10 with a chassis 12, side walls 14, an arm-and-roller assembly 16 and an endless, flexible bale forming element 18.

The round baler 10 is shown as a pull type round baler, to be coupled to a pulling vehicle, like a tractor, but can be part of a self-propelled vehicle as well. Such a round baler 10 is used to produce bales 20, 22 (FIG. 5) of straw, hay, alfalfa, etc., in a main bale forming chamber 24 and an auxiliary chamber 26, which bales 20 are tied or wrapped before they are ejected and dumped to the ground. This type of a round baler 10 is formed as a so-called non-stop round baler, i.e., the round baler 10 is picking up and baling crop, without interrupting the advancement over the field.

Figure 7:
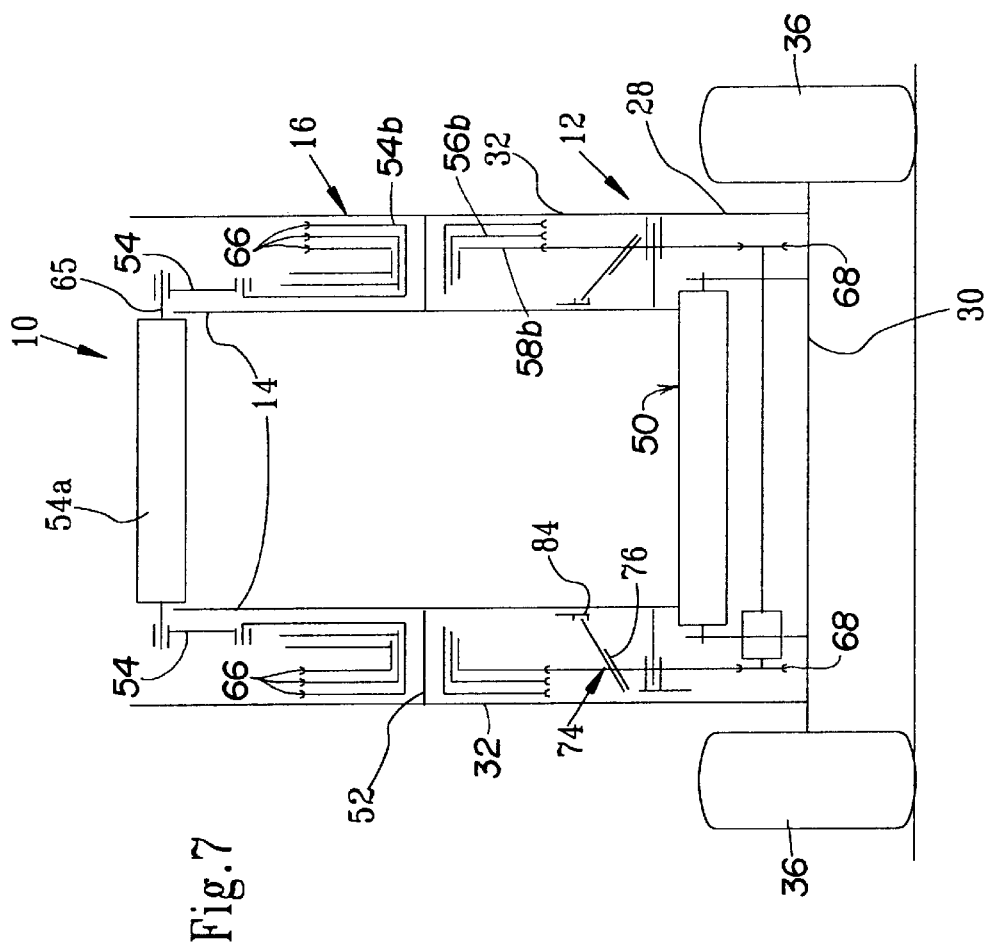
FIG. 7 is a schematic rear view of the round baler of FIG. 1 illustrating the filler plates.

As can best be seen in FIG. 7, the chassis 12 includes a frame 28 supported on an axle 30, and defined by opposite vertical side structures 32 supporting a tongue 34 to connect the round baler 10 to a tractor or the like. The axle 30 is equipped with wheels 36 to support the round baler 10 on the ground, whereas the wheels 36 may be single wheels or wheels on a tandem axle (not shown). The opposite side structures 32 may be provided with side shields (not shown) to cover the functional elements of the round baler 10 for security reasons.

Extending between, and rotatably mounted to, the side structures 32 is a lower front roll 38, an upper front roll 40, a moveable roll 42 and an upper rear roll 44. Also extending between, and supported by, the side structures 32 is a pick-up assembly 46, a front bottom conveyor 48 and a rear bottom conveyor 50.

In side view, the side walls 14 are substantially of a wedge shape with rounded edge portions, whereas their height at the front of the round baler 10 is less than at the rear. The size and form of the side walls 14 is determined by the shape and size of the bales 20, 22 formed in the auxiliary and in the main chambers 24, 26. The bottom edge of the side walls 14 is substantially a straight line having a length equal to the sum of a conveying plane of the front and the rear bottom conveyors 48, 50 and disposed parallel to the rear bottom conveyor 50, which is disclosed as being horizontal. According to FIG. 7, the side walls 14 are fixed to the structure 32 in a center area by means of an axle 52. In order to withstand the pressing forces in the bale chambers 24, 26 the side walls 14 are reinforced against bending in a known manner by means of stiffener plates and bars (not shown). The axles 52 may be provided with a hydraulic cylinder or the like to move the side walls 14 laterally over a small distance to decrease the friction between the bales 20, 22 and the side walls during ejection of the bale 20 or over bigger distances like 0.2 m to increase the width of the bale chamber 24, 26 during the full bale forming process. The diameter and the cross section of each axle 52 depends on the structure of the arm-and-roller-assembly 16, which is rotating about said axles 52.

The arm-and-roller-assembly 16 comprises a first arm 54, a second arm 56 and a third arm 58, each provided with a pair of parallel rollers 54a, 56a, 58a, respectively. The assembly 16 further comprises a first drive 54b, a second drive 56b and a third drive 58b assigned to the respective arms 54 to 58.

Each arm 54–58 is formed of two parts 60, 62 (see arm 58 in FIG. 2, for example), which are moveable with respect to each other and the relative position between which can be adjusted by a motor 64, which preferably is a hydraulic motor or alternatively an electric motor. According to FIG. 2, the parts are hinged to each other in a joint, the pivot axis of which is parallel to the longitudinal axis of the axle 52, with the parts 60, 62 being of about the same length. In a not shown alternative arrangement, both parts 60, 62 are connected to each other in a telescopic fashion, allowing an extension and retraction in a mere radial direction. One first, second and third arm 54–58 is provided on each side of the round baler 10 in the space between the side walls 14 and the side structures 32. The arms 54–58 of each set are pivotally connected to a central location of a brace or carrier 65 which rotatably receives the respective rolls 54a–58a at opposite ends thereof. Preferably the rolls 54a–58a can assume different positions versus the arms 54–58 to follow the periphery of the side walls 14. The respective inner parts 60 of the arms 54–58 are journalled on the axle 52 directly or indirectly for a rotation thereabout. For that purpose each inner part 60 is provided with a wheel 66, here shown as a belt pulley. According to FIG. 7, all wheels 66 are journalled concentrically, whereas the wheel 66 of the first arm 54 is radial innermost and the wheel 66 of the third arm 58 is the radial outermost.

Each of the drives 54b–58b has a drive wheel 68, which drive wheels 68 can be driven independent of each other by means of a hydraulic motor (not shown) for example, or via a mechanical transmission and clutches. Each drive 54b–58b also comprises an endless, flexible drive element 70, here shown as a belt, surrounding the wheel 66 and the drive wheel 68 and being engaged with both. If the wheels 66 and the drive wheels 68 are formed as sprockets, the drive element is a chain; if they are formed as sheaves, the drive element is a belt. Each drive 54b–58b is operated such, that it can bring the respective arm 54–58 into a certain position and keep it in said position until a change is necessary. As is apparent from FIGS. 1 to 6, the arms 54–58, while remaining in the same sequence, rotate about the axle 52 during one full baling cycle, whereas the distance between and the operational length of the individual arms 54–58 changes through the cycle. In order to avoid a bending and/or torsion of the assembly consisting of the respective arms 54–58 and the braces 65, a respective drive 54b–58b is provided preferably on both sides of the round baler 10.

The flexible bale-forming element 18 is formed in this embodiment by multiple belts arranged side by side and starting with the belts lower front roll 38 are trained over the rolls 38, 40, 44, 58a, 56a, 54a and 42. Alternatively, a chain-and-slat-assembly could be used. The flexible bale forming elements 18 are well known and fixed in length and width, although they may lengthen slightly under the tension applied. The number of bale forming elements 18 corresponds to the distance between the side walls 14 and can be varied if said distance is changed. The bias in the bale forming elements 18 is maintained by means of force applied by a spring 72 or the like on the moveable roll 42. The moveable roll 42 may be carried on a pivotable arm (not shown) or in a sliding carriage (not shown) against the bias of said spring 72. At least one of the rolls 38, 40, 44, 58a, 56a, 54a, 42 is driven and preferably it is one of the stationary rolls 38, 40, 44, whereas rubber sleeves of smaller width and with grooves may be used between the rolls 38, 40, 44 and the bale forming elements 18 to increase the drive friction.

While the embodiments shown in the drawings have two rolls 54a, 56a, 58a on each arm, one roll 54a, 56a, 58a may be sufficient. The advantage of having two rolls 54a, 56a, 58a is a better routing of the flexible bale forming elements 18 and the ability to create a bigger distance between the bale chambers 24, 26. Contrary, it is possible to have three rolls 54a, 56a, 58a offset to each other and pressing the flexible bale forming elements 18 onto each other to create some friction. Depending on the travel direction of the flexible bale forming elements 18, such friction may increase the tension in the bale forming elements downstream of the elements and decrease the friction upstream of elements. This enables the tension in the bale forming elements to be reduced in the auxiliary bale forming chamber 26, which assists in starting a bale, and to increase the tension of the bale forming elements in the main bale forming chamber 28, which provides for a higher density of the bale 20. The friction may be adjusted by means of motors, screws, etc.

Figure 4:
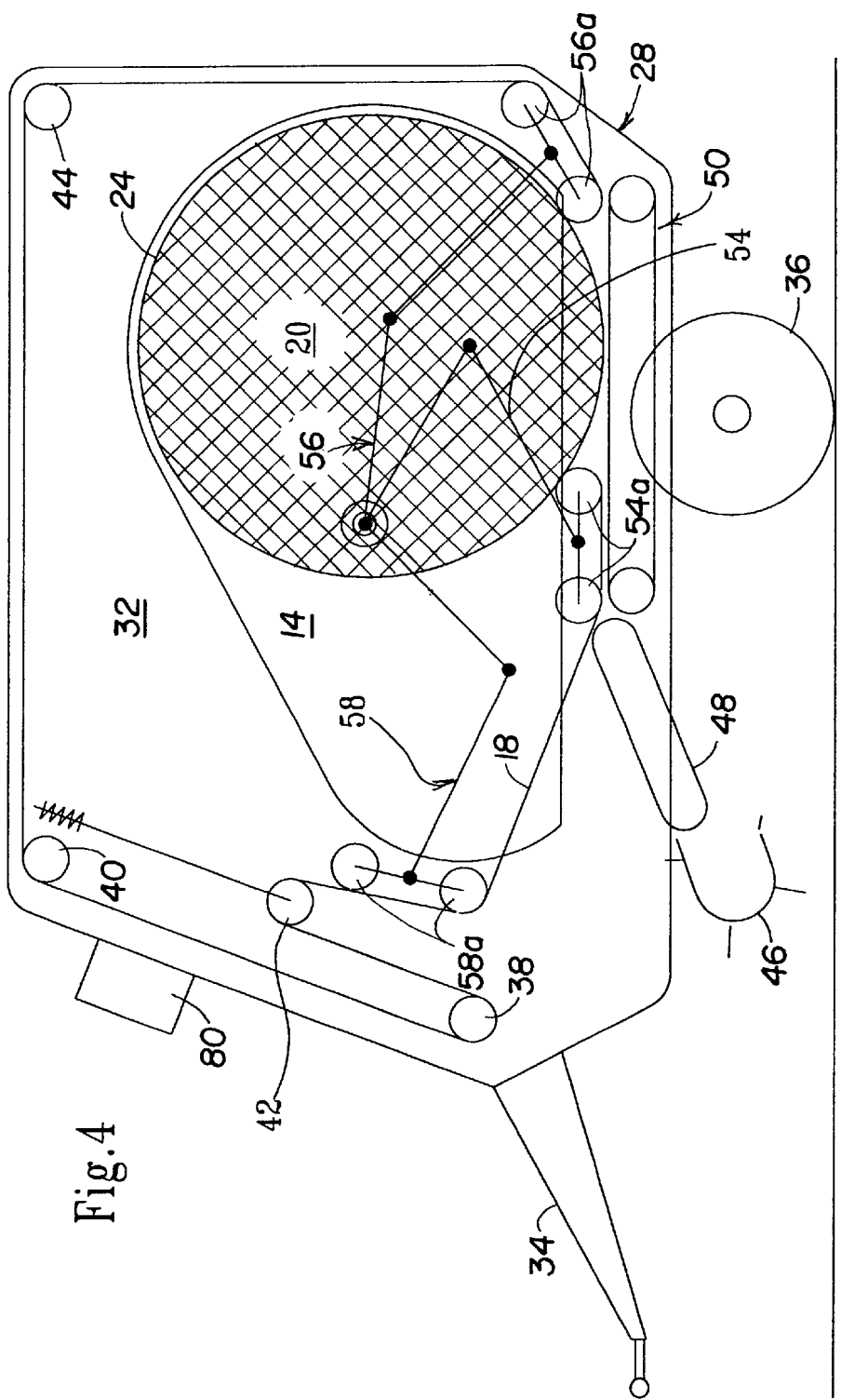
FIG. 4 is a view like FIG. 1, but showing a completely filled main bale chamber now moved to the rear of the round baler.
Figure 5:
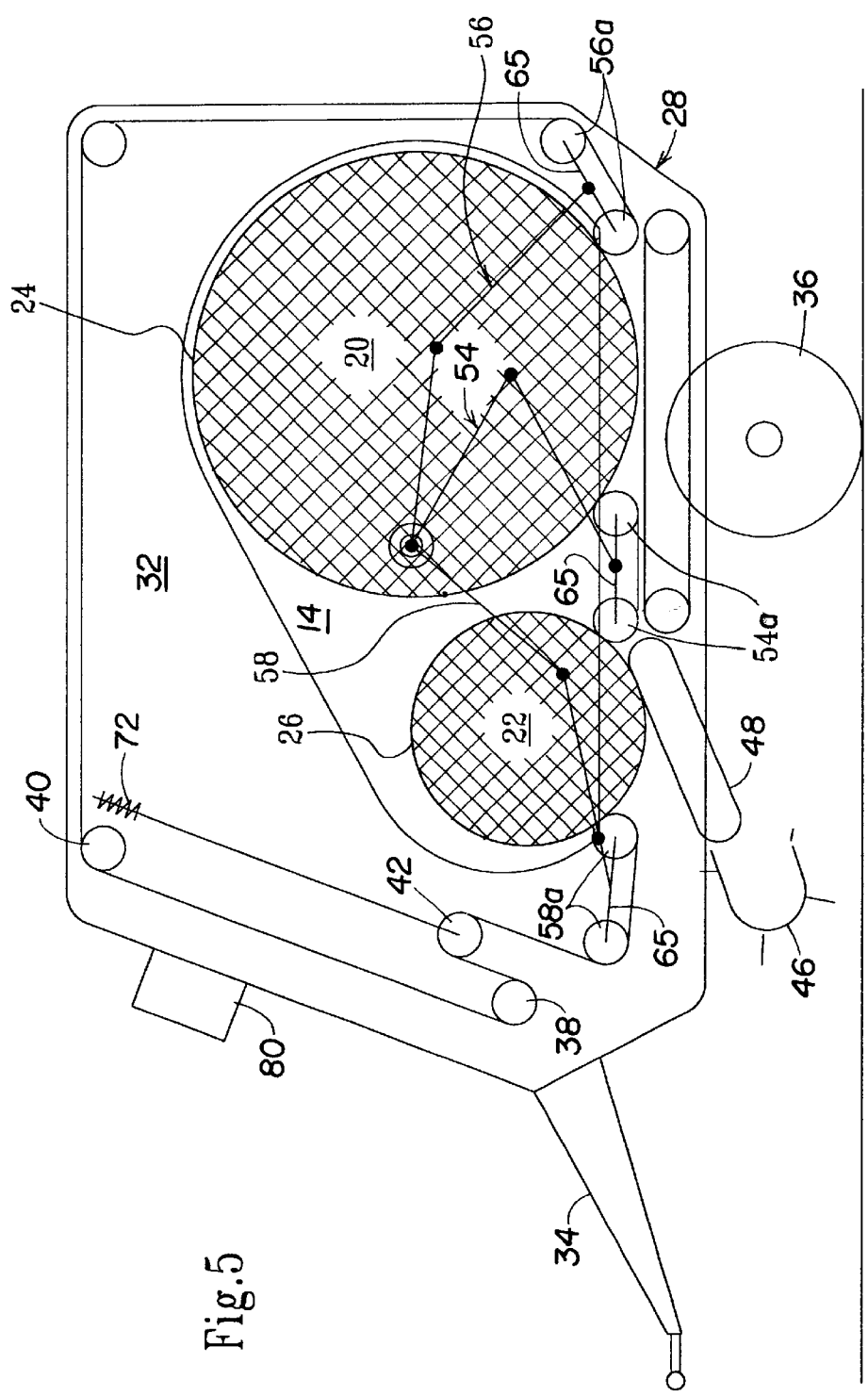
FIG. 5 is a view like FIG. 1, but showing a filled main bale chamber in the rear and an auxiliary bale chamber in the front.

As can best be seen in FIG. 5, the arm-and-roller assembly 16 enables the main and auxiliary bale forming chambers 24 and 26, respectively, to be formed, with the main bale forming chamber 24 being the rear one, in which the bale 20 is completed. The main bale forming chamber 24 is substantially enclosed by a loop of the flexible bale forming elements 18 formed between the adjacent rolls 56a and 54a of the second and the first arm 56, 54 while the auxiliary bale forming chamber 26 is substantially enclosed by a loop of the flexible bale forming elements 18 formed between the adjacent rolls 58a and 54a of the third and the first arm 58, 54. The size of the loops depends on the position of the arms 54 to 58, whereas, within limits, the size of each single loop can be varied by adjusting the position and the length of the involved arms 54, 56 or 54, 58. It is visible from FIG. 5 that the loops do not extend beyond the periphery of the side walls 14. As it is apparent from the sequence given in the order of FIGS. 2 to 4, each auxiliary bale forming chamber 26 turns into a main bale forming chamber 24 as soon as it is moved far enough to the rear, so that a second loop may be formed above the front bottom conveyor 48.

The pick-up assembly 46 is of a conventional design with elastic tines rotating in vertical planes to lift crop from the ground and deliver it rearwardly into a gap between the front bottom conveyor 48 and the bale forming elements 18. The pick-up assembly 46 may be wider than the distance between the side walls 14 and have converging augers to deliver said crop toward a center area, as it is known in the prior art and, thus, not shown.

The front bottom conveyor 48 is located between the pick-up assembly 46 and the rear bottom conveyor 50. It is located underneath the front portion of the side walls 14 and extends over about ⅓ of the length of them and is inclined with respect to the rear bottom conveyor 50. Due to the inclination, a wedge is formed between the top surface of the front bottom conveyor 48 and the underside of the bale forming elements 18 located above the conveyor 48. This wedge shape facilitates the bale starting process, and the position of the first arm 54 is chosen to provide a trouble free bale start.

The rear bottom conveyor 50 is immediately behind the front bottom conveyor 48 and extends almost to the rear end of the side walls 14. While in the embodiment shown, the rear bottom conveyor 50 is oriented more or less parallel to the ground, this is not a must. For example, the rear bottom conveyor 50 may decline to the ground so as to let a finished bale 20 drop only a short distance before it reaches the ground.

While in the embodiment shown, the front and the rear bottom conveyors 48 and 50 consist of belts, a canvas or a chain-and-slat assembly wound about front and rear rolls, of which at least one is driven, other embodiments like a series of rolls, paddles or the like forming an elongated closed conveying surface underneath the side walls 14 are possible, too. Preferably the bottom conveyors 48, 50 are wider than the bale chambers 24, 26 or at least as wide as their maximum width. Finally, both bottom conveyors 48, 50 may be combined to form a single conveyor.

Referring to FIG. 7, there can be seen a filler plate assembly 74 provided on each side of the round baler 10 between the lower edge of the side walls 14 and the conveyor plane of the front and the rear bottom conveyor 50 to prevent crop, like leaves or brittle straw to escape from the respective bale forming chamber 24, 26 through this gap. Each filler plate assembly 74 comprises a filler plate 76, which is moveable between a position closing said gap and a position in which it is moved out of the track of the respective rolls 54a, 56a, 58a. Movement may be achieved either through slanted surfaces at the front end, so that the approaching roll 54a, 56a, 58a moves the filler plate 76 away, or it may be achieved by an actuator like a motor, a linkage or the like, moving the filler plate 76 in a track or about an axis. Each filler plate 76 may consist of several portions which are moved subsequently away from the gap depending on the position of the respective roll 54a, 56a, 58a. Portions of the filler plate 76 may be moved in a cycle along the side walls in order to cover always the gap between the bottom conveyors 48, 50 to the side wall. For this purpose one set of portions of the filler plate 76 may be attached to the side wall 14 about a horizontal axis 84 to pivot away, when another portion moves along the side walls 14.

The position and the length of the arms 54–58 are controlled by means of a control circuit 78 having a controller 80 and sensors 82 and acting on the drives 54b, 56b, 58b and the motors 64.

The controller 80 is preferably in the form of a software operated computer located on the round baler 10 or on the pulling vehicle and is producing output signals according to a given program.

The sensors 82 may be provided to measure the position and radial extension of each arm 54–58. Other values may be gathered as well, like the condition and amount of the crop, the position of the moveable roll 42, the position of the round baler 10 on the field, the status of the tying or wrapping cycle, the diameter of the bales on each side, etc.

The output signals generated by the controller 80 provide for a movement of the arms 54–58 and their parts 60, 62 such, that the rollers 54a–58a at their end follow the sequence given in FIGS. 1 to 6.

While it is not shown in the drawing, a net wrap or tying mechanism may be provided at the open side of the main bale forming chamber 24 and in the interface area of between the bale forming elements 18 and the rear bottom conveyor 50.

Operation

Empty Bale Chambers—FIG. 1:

All arms 54–58 are in a lower position and the bale forming elements 18 extend over them to form sort of a shallow pan in which a front section forms a wedge with the upper surface of the front bottom conveyor 48. In this stage, the moveable roll 42 is in an upper position and the spring 72 is under little bias. The bale forming elements 18 do not provide a loop between the rolls 54a, 56a of the first and the second arm 54, 56 but a straight span.

Figure 2:
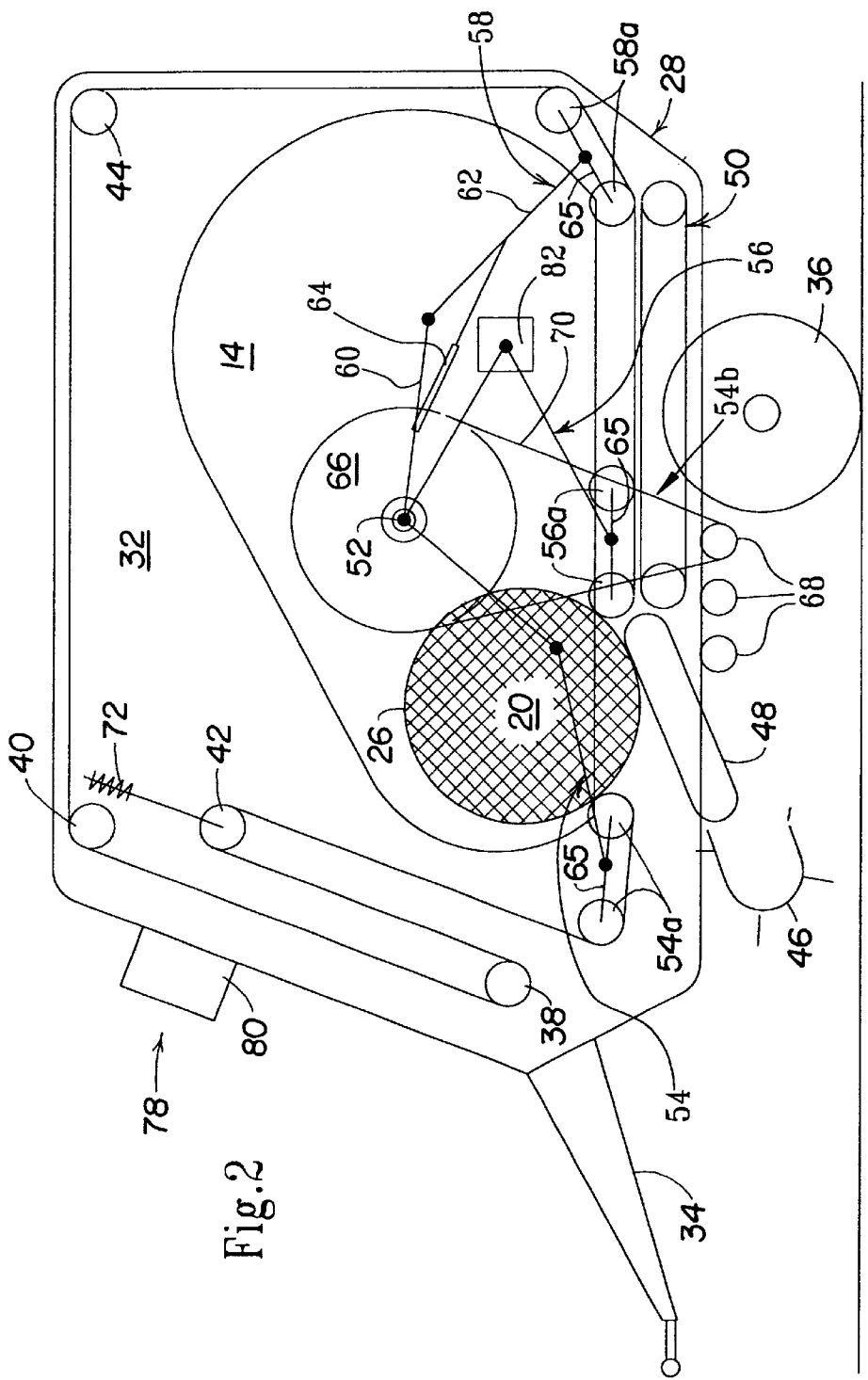
FIG. 2 is a view like FIG. 1, but showing a partially filled main bale chamber and adding some drive elements for positioning the arms that support the baleforming belt support arms.

Auxiliary Bale Chamber Gets Filled—FIG. 2:

Due to the crop fed by the pick-up assembly 46 and pushed upwardly against the span of the bale forming elements 18 between the rolls 54a and 56a of the first and the second arm 54, 56, said span is deflected upwardly to create a small loop in which crop is accumulated and formed to a cylindrical bale 22. The moveable roll 42 is moved out of its home position slightly. The first arm 54 is moved towards the second arm 56 to better close the auxiliary bale chamber 26 in its bottom area. The arms 56 and 58 are kept in their initial positions since the drives 56b and 58b are stopped. The rolls 54a, 56a are substantially in line with the lower edge of the side walls 14, while the rolls 58a follow the rounded corner at the end of the lower edge of the side walls 14.

Figure 3:
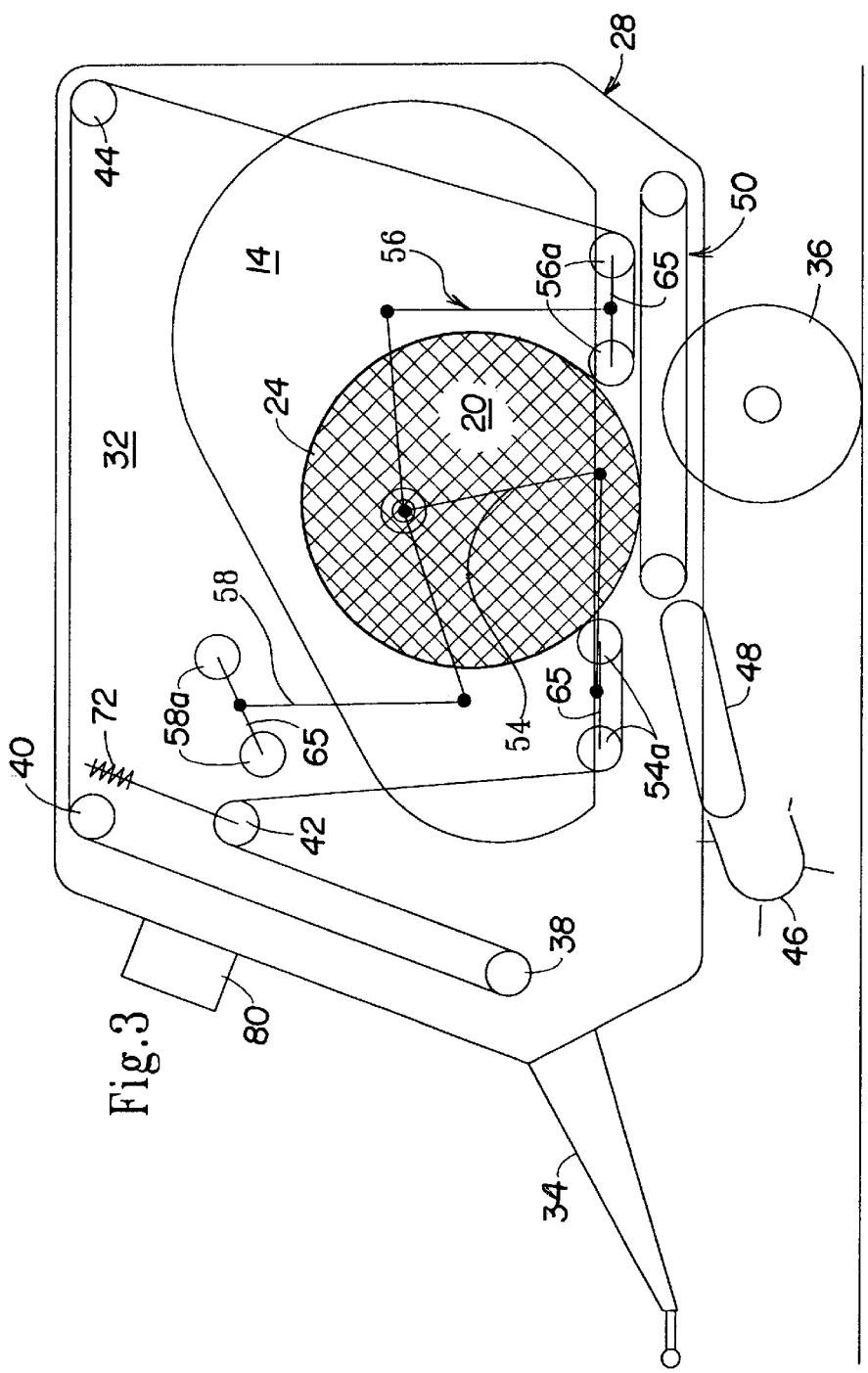
FIG. 3 is a view like FIG. 1, but showing an almost full main bale chamber.

Start of the Transition Stage from the Auxiliary Bale Chamber 26 to the Main Bale Chamber 24—FIG. 3:

All arms 54–58 are moved counterclockwise, as seen in the FIGS. 1–6. Thus the rolls 54a of each first arm 54 come close to the rear bottom conveyor 50 but still allow crop to be fed into the auxiliary bale chamber 26, the rolls 56a of the second arm 56 move to a position located above the rear half of the rear bottom conveyor 50 and the rolls 58a of the third arm 58 are moved to a position in which they are not longer in engagement with the bale forming elements 18. Preferably the rolls 58a assume a position close to the moveable roll 42. The rolls 54a, 56a are substantially in line with the lower edge of the side walls 14. The loop and the bale 20 are bigger than the loop and bale shown in FIG. 2.

Main Bale Forming Chamber 24 is Filled Completely—FIG. 4:

The position of the arms 54–58 in FIG. 4 is substantially the same as in FIG. 1, however the third arm 58 is now where the first arm 54 was, the second arm 56 is where the third arm 58 was and the first arm 54 is where the second arm 56 was. The bale 20 reached its full diameter and is ready to be tied with twine, plastic or net. The wedge shaped space underneath the span between the rolls 58a and 54a of the third and first arms 58, 54 and above the front bottom conveyor 48 is ready to receive crop and to start rolling a new bale 22. The moveable roll 42 is moved further against the bias of the spring 72.

A Bale 22 is Formed in the Auxiliary Bale Chamber 26, While a Bale 20 is Still in the Main Bale Forming Chamber 24—FIG. 5:

While the first and the second arms 54, 56 remained in their positions, the third arm 58 has been lowered and approaches the front bottom conveyor 48, but still leaves an inlet for the crop to be baled. In the meantime the bale 20 in the main bale forming chamber 24 is wrapped or tied.

Figure 6:
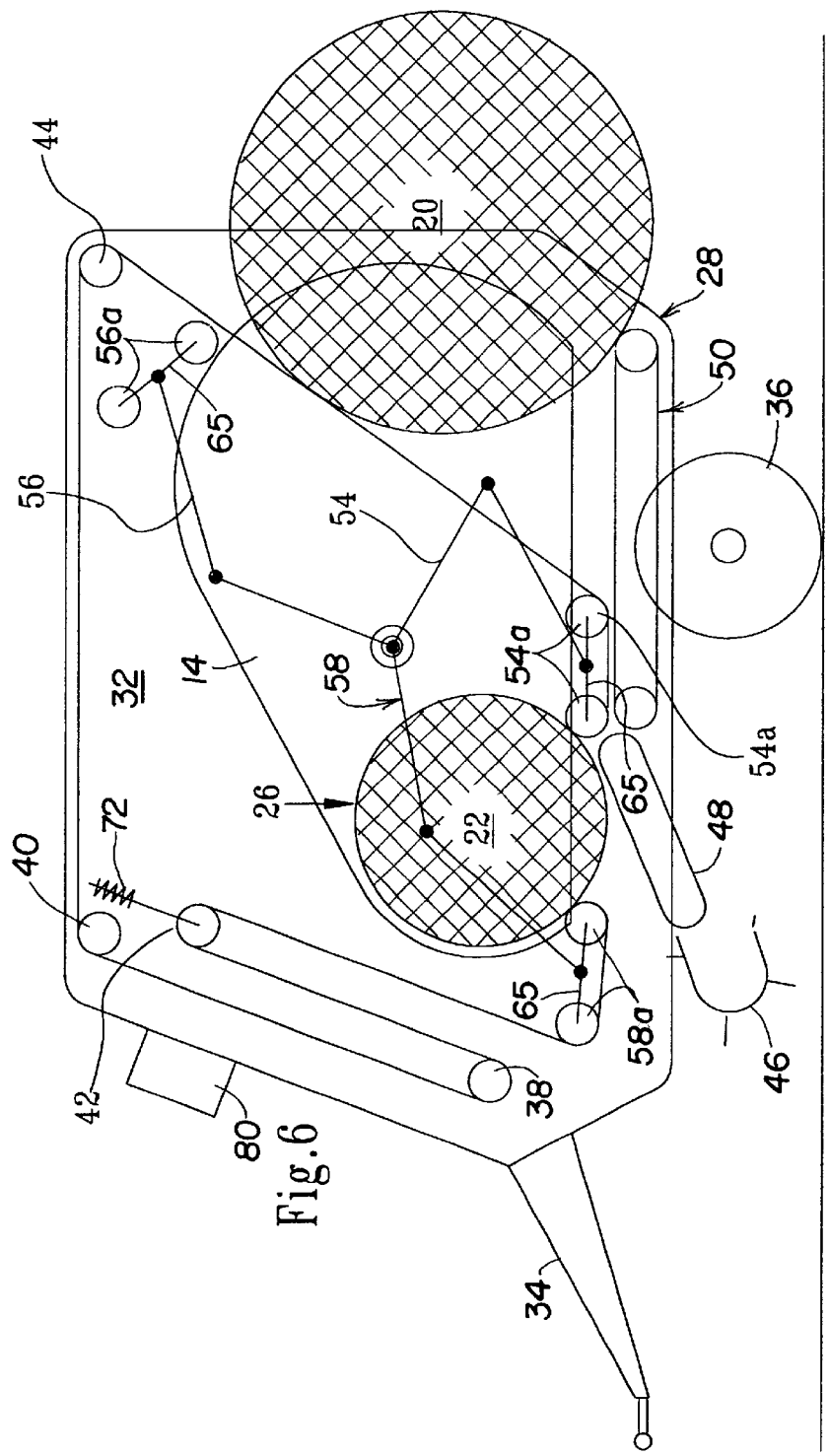
FIG. 6 is a view like FIG. 1, but showing the main bale chamber in an open condition and the auxiliary bale chamber filled and ready to be moved rearwardly.

The Bale 20 is Ejected from the Main Bale Forming Chamber 24, While the Bale 22 in the Auxiliary Bale Chamber 26 Grows—FIG. 6:

The third and the first arms 58 and 54 remained in their positions, while the second arm 56 is lifted to open the loop of the main bale forming chamber 24 and create a straight span between the rolls 54a of the first arm 54 near the rear bottom conveyor 50 and the upper rear roller 44. Due to this action the bale 20 is ejected rearwardly and dumped onto the ground. During this ejection, crop is fed continuously to the auxiliary bale forming chamber 26 to increase the diameter of the bale 22 therein. The moveable roll 42 moves back to its initial position, and after the bale 20 is ejected, the second arm 56 is lowered to the position of the first arm 54 as shown in FIG. 2.

Whenever the rolls 54a–58a are moved through the gap between the lower edge of the side walls 14 and the top surface of the rear bottom conveyor 50, the filler plates 76 are moved away to free the track.

Figure 8:
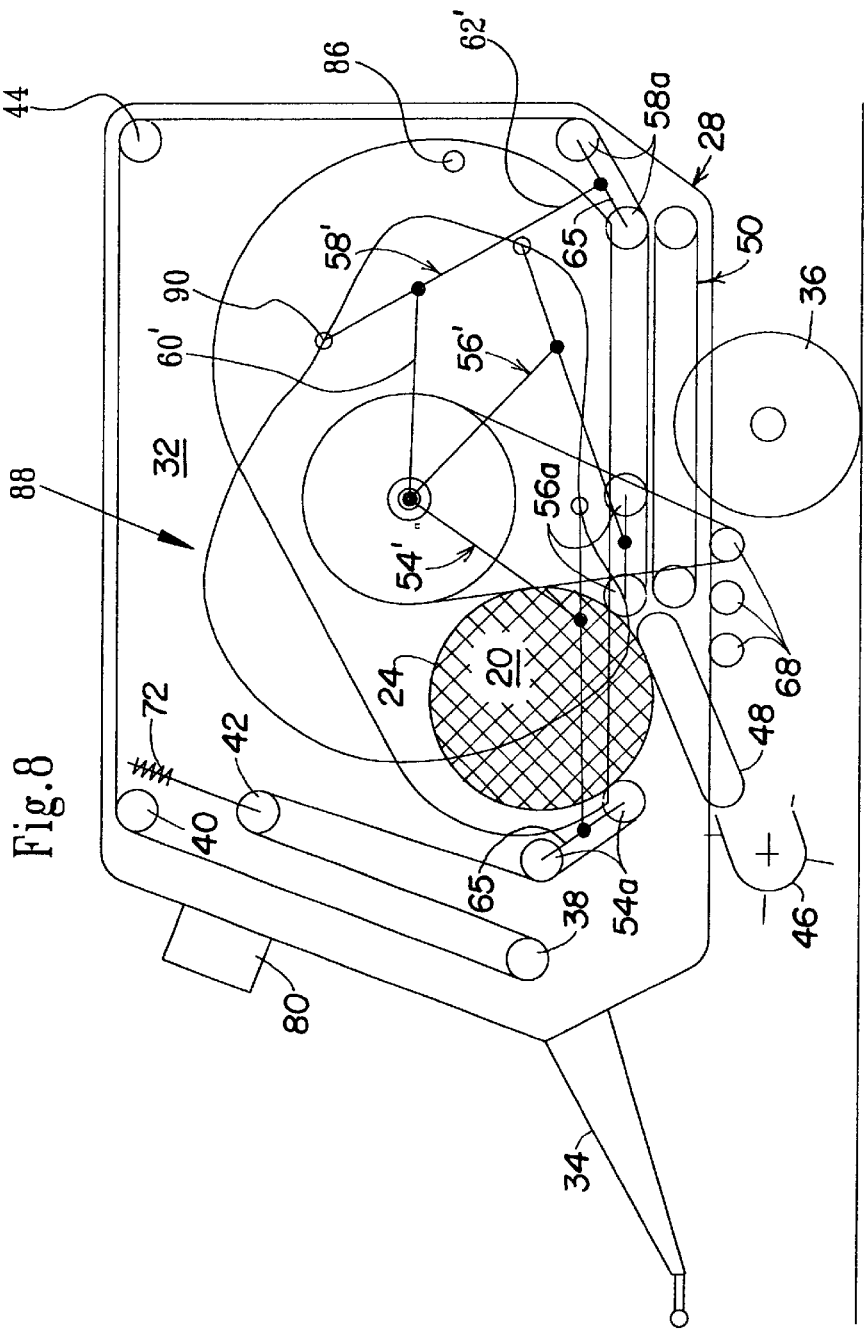
FIG. 8 is a schematic left side view of a large round baler according to a second embodiment.
Figure 9:
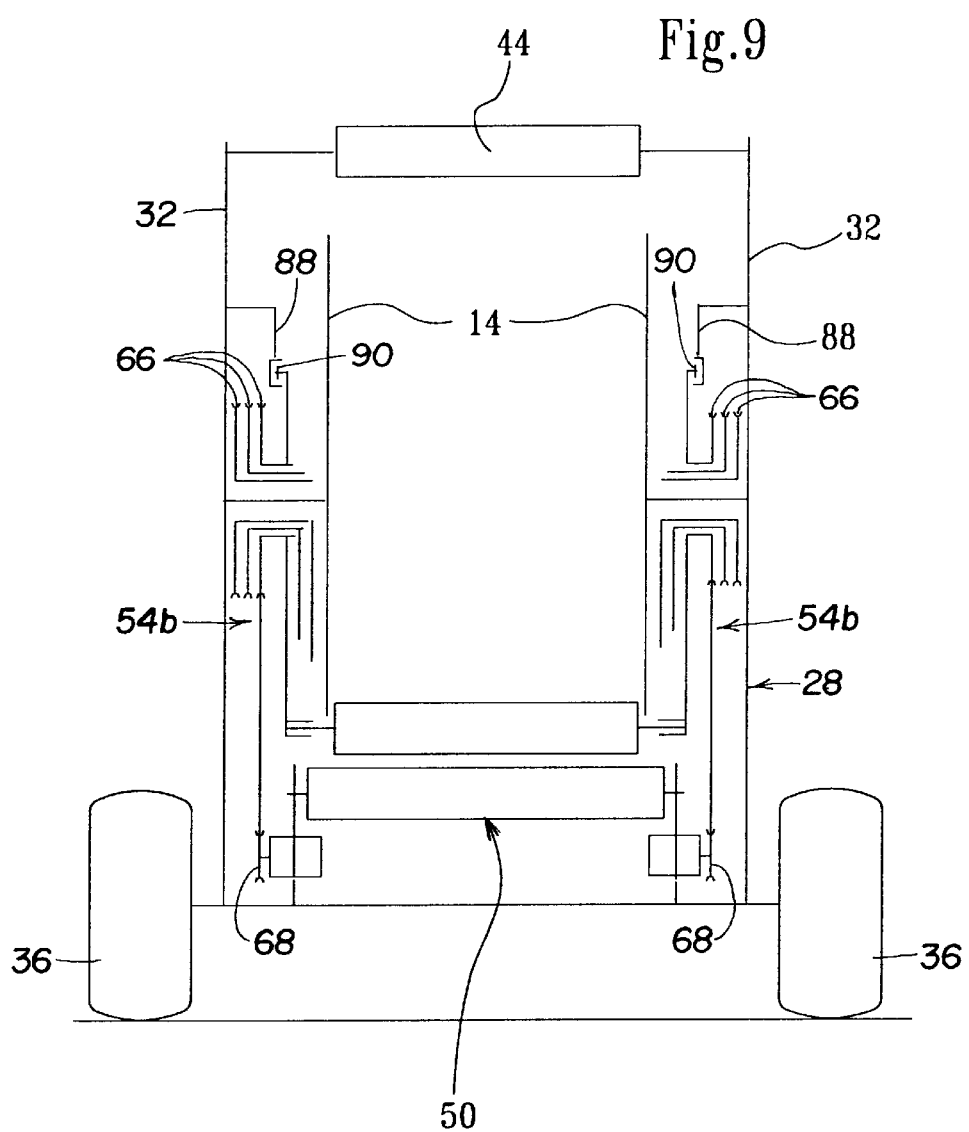
FIG. 9 is a schematic rear view of the large round baler of FIG. 8.
Figure 10:
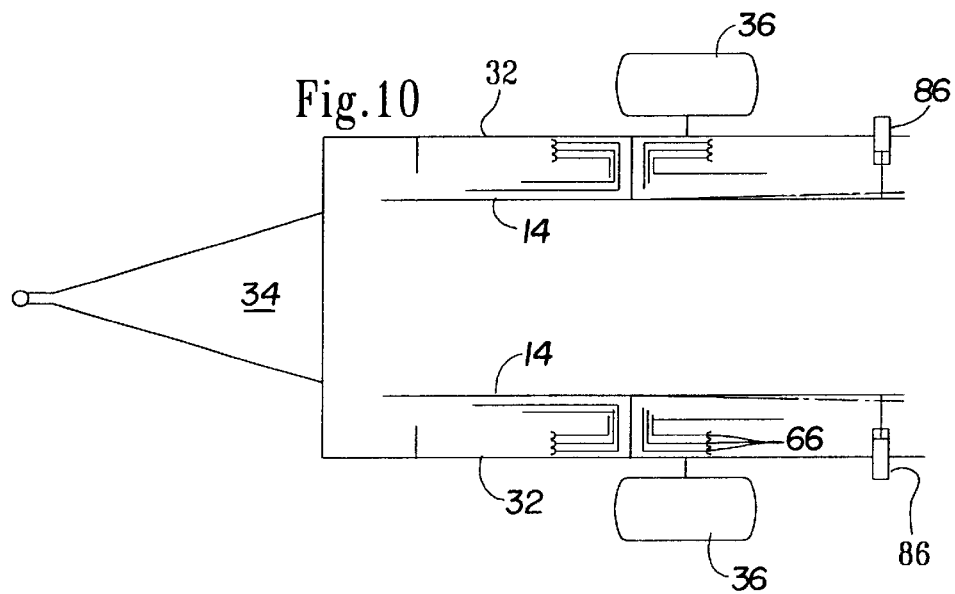
FIG. 10 is a schematic top view of the large round baler of FIG. 8, illustrating structure for keeping the side walls in place.
Figure 10A:
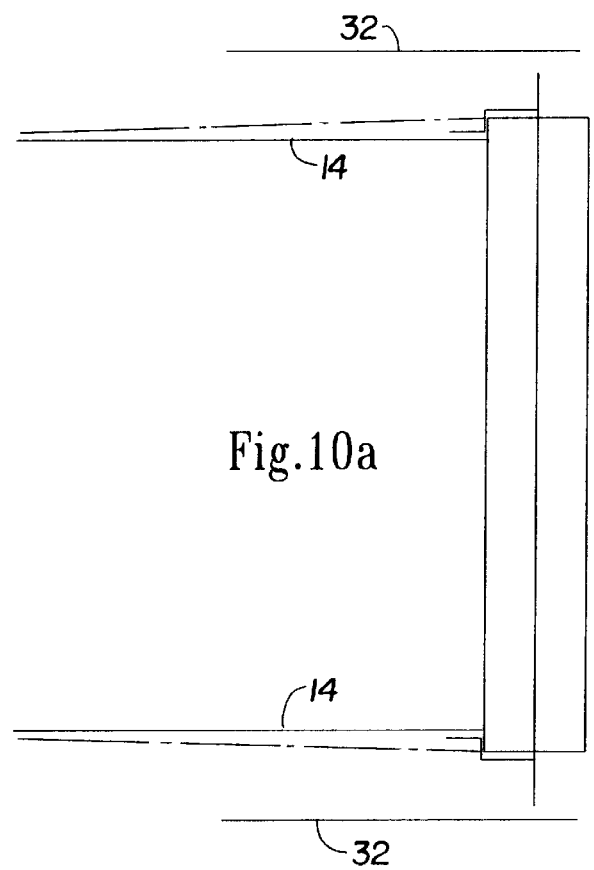
FIG. 10a is a schematic partial top view of the round baler of FIG. 8, but showing another structure for keeping the side walls in place.

FIGS. 8 to 10 show an alternative embodiment of the round baler, which conceptionally is the same as the one shown in FIGS. 1 to 7, but there are differences in the structure and control of the arms 54, 56, 58 as well as in the presence of a support 86 for each of the side walls 14.

According to FIG. 8 a track 88 is provided in a vertical plane, with this track 88 being almost a mirror image of the contour of the side walls 14. The shape of the track 88 is chosen such that the rolls 54a, 56a, 58a follow substantially the contour of the side walls 14 during the rotation of arms 54', 56', 58'. The track 88 may be formed of a rail with the cross section of a "U". The tracks 88 are illustrated fixed to the structure 32, but may instead be fixed to the side walls 14.

The arms 54', 56', 58' are each again formed of inner and outer parts 60', 62', which are pivotally connected to each other. Each of the outer parts 62' at one end carries the rolls 54a, 56a, 58a and is provided at its other end with a trunnion 90, which is received in said track 88.

The support 86 may comprise a hydraulic cylinder or the like fixed to the structure 32 and being moveable towards and away from the side walls 14. In a retracted position, sufficient space is provided between the support 86 and the adjacent side wall 14 to let the arms 54', 56', 58' pass therethrough, when the bale gets ejected. In an extended position, the support 86, e.g., a piston of a hydraulic cylinder assembly, abuts the outer face of the side walls 14 and restrains the side walls 14 from bending outwardly. According to FIGS. 8 and 10, the support 86 is provided only at the rear end of the side walls 14, since high bending forces may be expected there only, whereas in the area of the auxiliary bale forming chamber 26 the side walls 14 should be stiff enough to withstand the forces inside said bale forming chamber 26. Nevertheless supports 86 may be provided at various places of the side walls 14.

According to a not shown alternative to restrain the side walls 14 from bending outwardly, each brace 65 may be provided with stops, possibly carrying rolls, sliding along the outer face of the side walls 14.

The third embodiment illustrated in FIGS. 11 to 15 uses the same concept, i.e., the arm-and-roller assembly 16 as the first embodiment, but is different as concerns the feeding of the crop and the way the bale chambers 24, 26 are closed in a bottom area.

Figure 12:
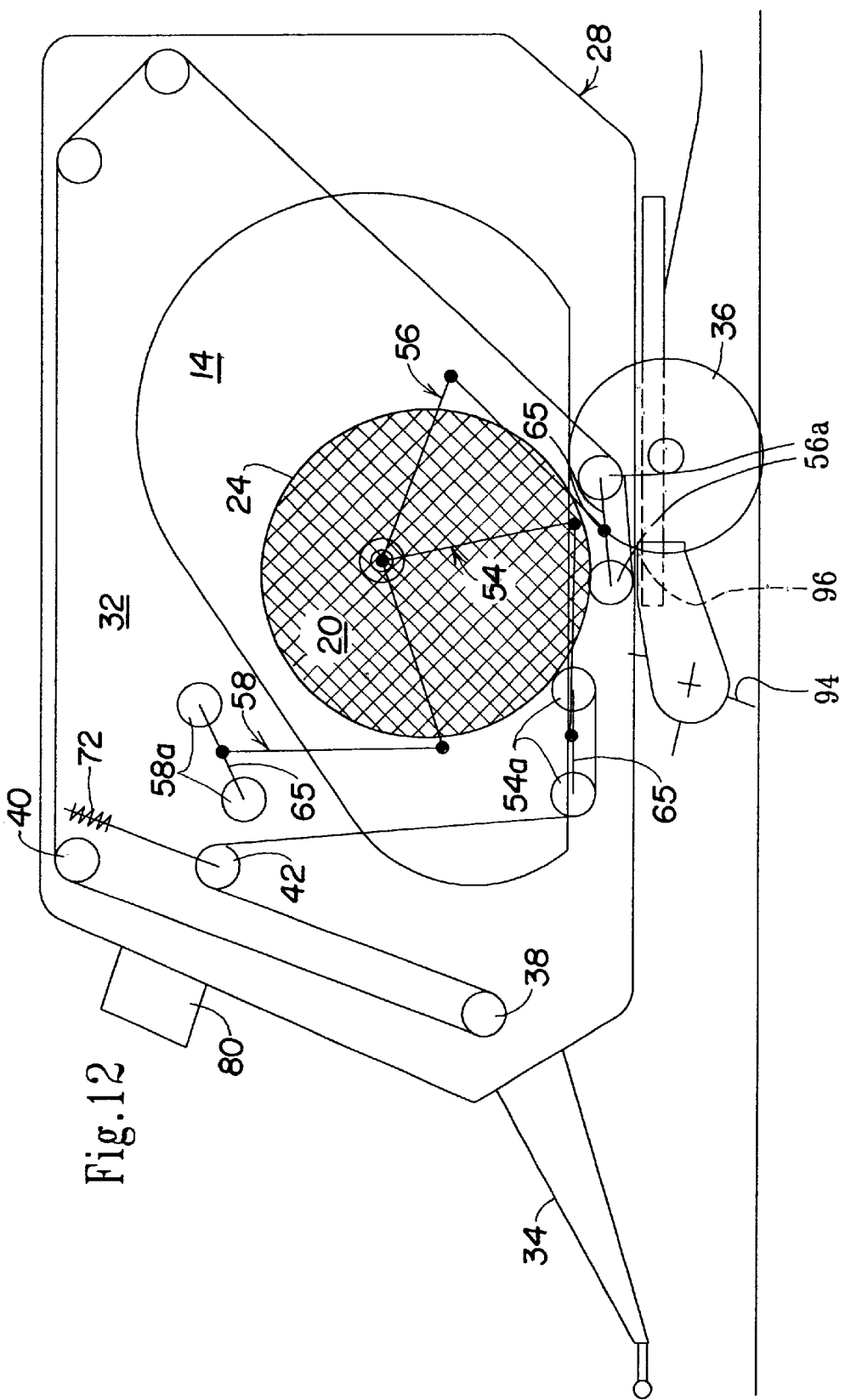
FIG. 12 is a view like that of FIG. 11, but showing a partly filled main chamber.

Specifically, in the third embodiment, when only one bale is present, like is illustrated in FIG. 3 of the first embodiment, the adjacent arms 54, 56, with respective rollers 54a, 56a, respectively extend further to the rear and to the front than the arms 54, 56 in the other embodiments, so that the rollers 54a, 56a, are closer to each other, which enables them to cover the bottom of the main bale forming chamber 26 so far, that a bale formed therein is carried just by the rolls 54a, 56a of the first and second arm 54, 56, as viewed in FIG. 12. Basically, in the third embodiment, the rolls 54a, 56b, 58b respectively carried by the leading and trailing ones of the arms 54, 56 and 58, are being used in forming any given bale chamber and are disposed closer together so that the bottom conveyors 48 and 50 may be eliminated when used together with a moveable pick-up assembly 46 as described below.

Figure 11:
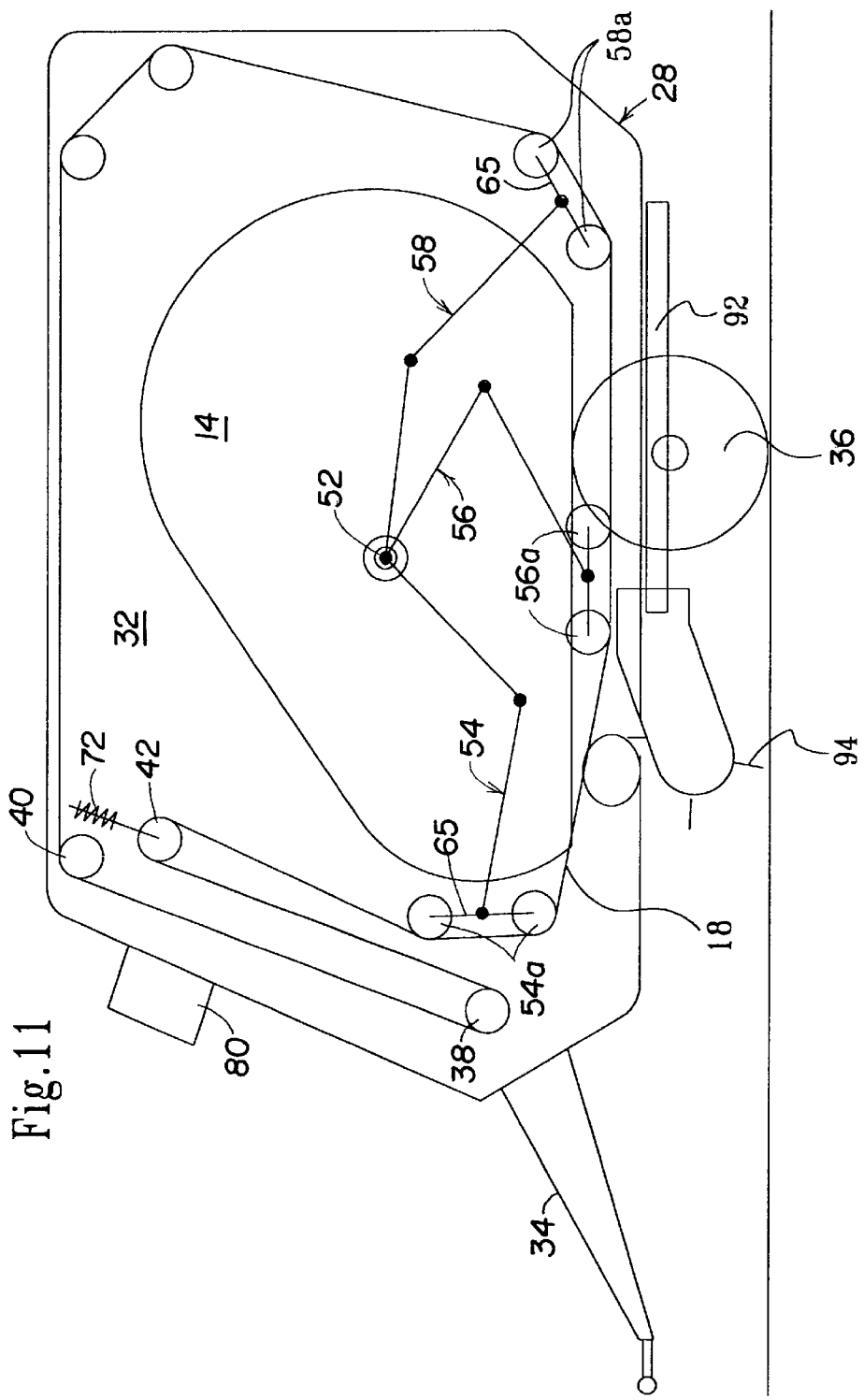
FIG. 11 is a schematic left side view of a large round baler according to a third embodiment.
Figure 13:
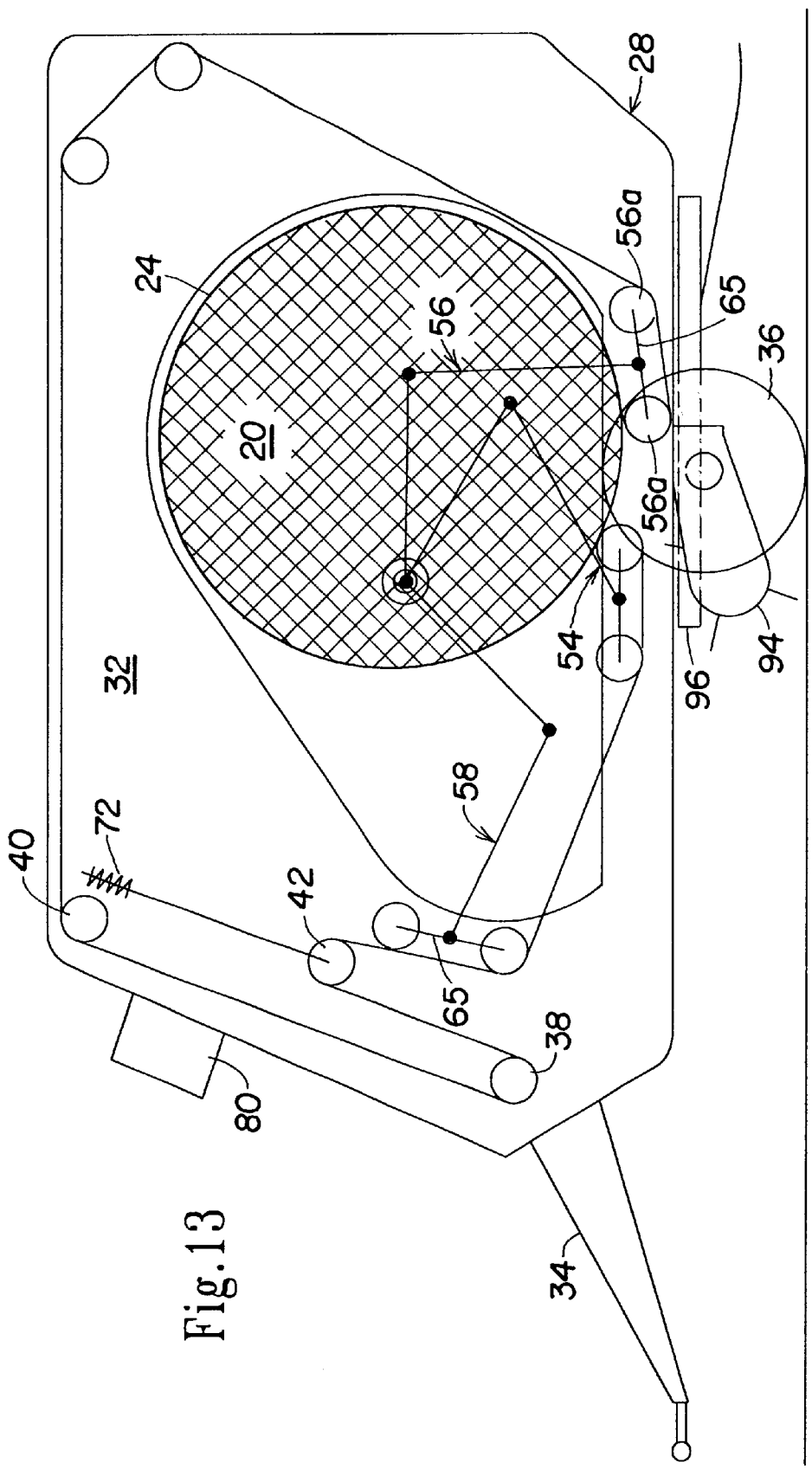
FIG. 13 is a view like that of FIG. 11, but showing a completely filled main chamber.
Figure 14:
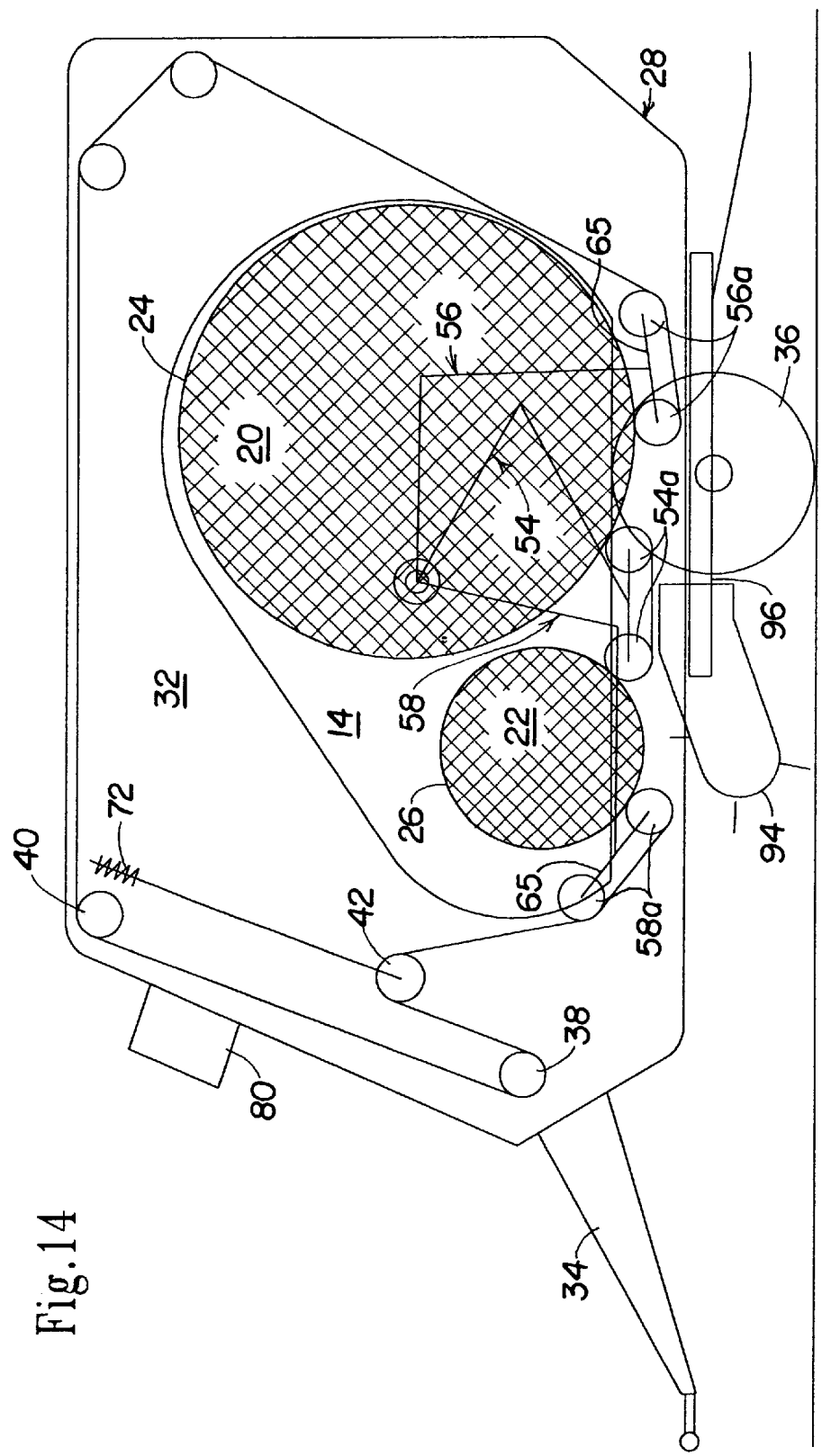
FIG. 14 is a view like that of FIG. 11, but showing a completely filled main chamber and a partially filed auxiliary chamber.
Figure 15:
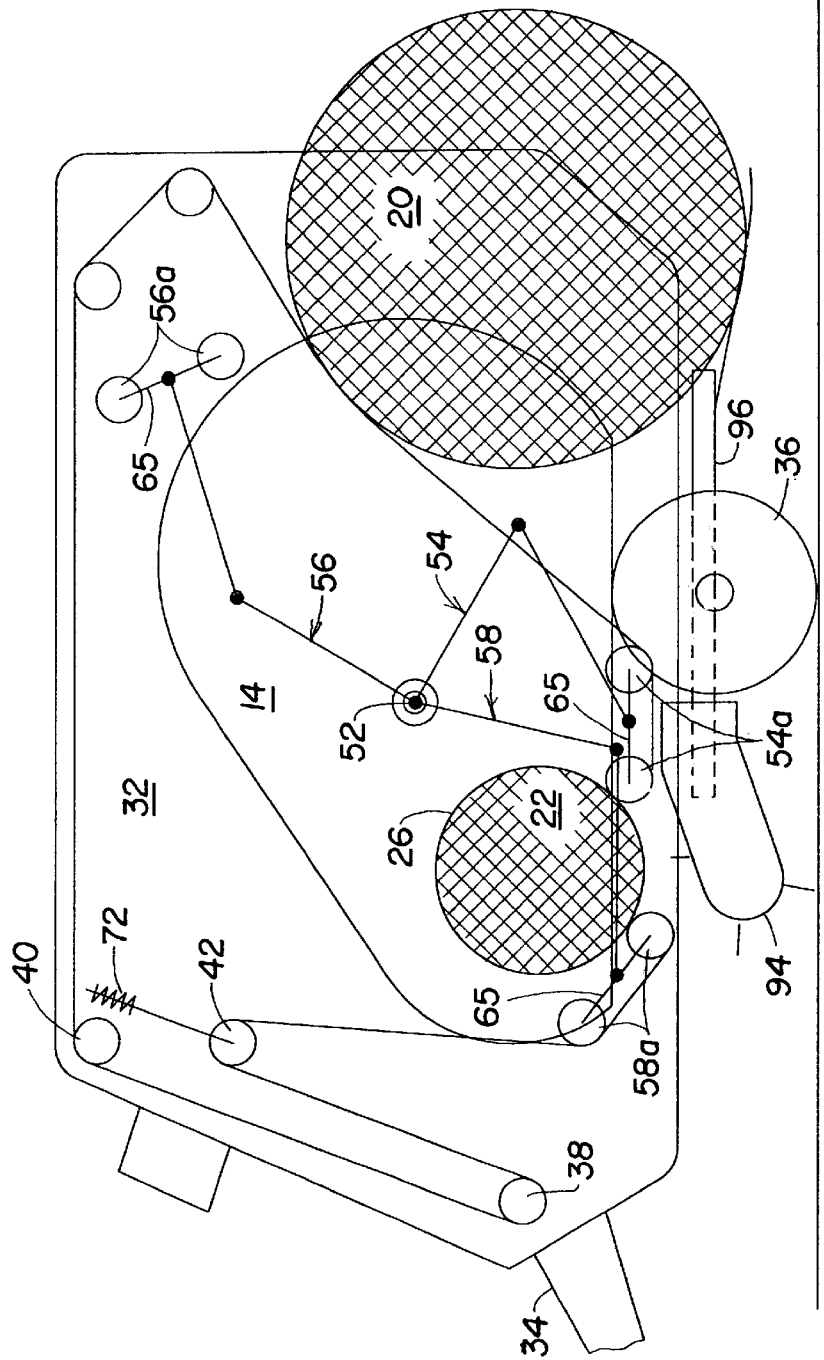
FIG. 15 is a view like that of FIG. 11, but showing a partially filled auxiliary chamber and an opened main chamber.

The situation shown in FIG. 11 corresponds to that in FIG. 1, that in FIG. 13 to FIG. 4, that in FIG. 14 to FIG. 5 and that of FIG. 15 to FIG. 6.

Furthermore, the pick-up assembly 46 is carried in rails 92 attached to the structure 32 and extending in the space between the wheels 35. The position of the pick-up assembly 46 along the longitudinal axis of the round baler 10 is controlled by non-shown hydraulic motors. Linear hydraulic motors could move the pick-up assembly 46 on gliders or rolls in the rails 92, or a gear wheel of a rotating hydraulic motor could mesh with a tooth bar in the rails 92.

According to FIG. 12 in comparison with FIGS. 11 to 15, the pick-up assembly may also be tilted about a horizontal axis in order to fit under the rollers 56a of the second arm 56, when these are moved close to the rollers 54a of the first arm 54 in order to close the main bale forming chamber 24 in its bottom area. Tilting the pick-up assembly may be achieved by guide tracks or adjusting means, like a hydraulic motor and a respective control device.

The pick-up assembly 46 may include a support surface 96, located behind a reel or picking unit 94, on which crop is sliding to be engaged by a span of the bale forming elements 18 to become wedged and rolled after that.

The control of the pick-up assembly 46 is such that the pick-up assembly 46 constantly moves with the bale chamber to be fed with crop from the front to the rear, as illustrated in FIGS. 11 to 15. As soon as the main bale forming chamber 24 is filled and the bale therein is ready to be wrapped or tied, the pick-up assembly 46 moves to the front to feed the auxiliary bale forming chamber 26, whereas the bale in the main bale forming chamber 24 is kept in latter by the rollers 54a and 56a (FIG. 14).

Having described the preferred embodiment, it will become apparent that various modifications can be made without departing from the scope of the invention as defined in the accompanying claims.

What is claimed is:

1. A non-stop, large round baler, comprising:

a mobile chassis;

a bale chamber having opposite sides defined by transversely spaced side walls and by a fore-and-aft extending, yieldably tensioned, active flexible bale forming arrangement having a width spanning said side walls;

first, second, and third sets of right-and left-hand roll support arms being mounted for permitting each set to be moved fore-and-aft exclusive of any movement of the remaining two sets;

at least one roll extending transversely between, and being supported by, the right-and-left arms of each of said first, second, and third sets of support arms;

a crop gathering arrangement mounted to said chassis below, and operable for feeding crop towards, said active flexible bale forming arrangement;

three drive arrangements being respectively coupled to said first, second, and third sets of support arms for respectively moving them among:

(a) a first starting condition, wherein said at least one roll supported by said first set of support arms is located adjacent a lower front region of said side walls, and said at least one roll supported by said second set of support arms is located adjacent a lower middle region of said side walls; and a first section of said active flexible bale forming arrangement extends between said at least one roll carried by said first set of arms and said at least one roll carried by said second set of arms so as to define a first expandable bale chamber wall located for being engaged and expanded by crop delivered by said crop gathering arrangement for starting a bale core of a first bale to be formed, (b) an intermediate condition, wherein said first and second sets of arms are moved, as crop gathered by said crop gathering arrangement continues to be wrapped about said bale core, such that the at least one roll carried by said first set of arms is moved rearward so as to be located adjacent said lower middle region of said side walls, and such that the at least one roll carried by said second set of arms is moved rearward so as to be located adjacent a lower rear region of said side walls when said first bale is completed;

(c) a second starting condition, wherein said third set of arms is positioned such that said at least one roll carried by it is located adjacent said lower front region of said side walls so as to be in front of said at least one roll carried by said first set of arms and located adjacent said lower middle region of said baling chamber, and wherein a second section of said active flexible bale forming arrangement extends between the at least one roll carried by each of the third and first set of arms to define a second expandable bale chamber wall for being a sole section of said flexible bale forming arrangement located in a position for receiving crop from said gathering arrangement so as to form a second core of a second bale to be formed while said second set of arms is being moved so as to move said at least one roll carried by it out of the way to permit said first bale to be discharged.

2. The non-stop, large round baler, as defined in claim 1, wherein said crop gathering arrangement includes a floor conveyor arrangement located for cooperating only with said first and second expandable bale chamber walls for substantially covering a circumference of any bale engaged with said first and second expandable bale chamber walls.

3. The non-stop, large round baler, as defined in claim 1, wherein said transversely spaced side walls of said bale chamber are fixed to said chassis in respective areas inside respective peripheries of said side walls; said peripheries of said side walls being free of structure; and said at least one roll carried by each of said first, second, and third support arms being guided for moving about the peripheries of said side walls.

4. The non-stop, large round baler, as defined in claim 3, wherein said at least one roll carried by each of said first, second, and third sets of support arms extends beyond said side walls.

5. The non-stop, large round baler, as defined in claim 3, wherein said first, second, and third sets of support arms are mounted exteriorly of said side walls.

6. The non-stop, large round baler, as defined in claim 3, wherein said side walls are mounted for transverse adjustment relative to each other.

7. The non-stop round baler, as defined in claim 3, wherein the periphery of each said side wall acts as a track for a respective end of said at least one roll carried by each of said first, second, and third sets of support arms.

8. The non-stop, large round baler, as defined in claim 3, and further including a stiffener member mounted between the chassis and each side wall of said bale chamber.

9. The non-stop, large round baler, as defined in claim 1, wherein each arm of each of said first, second, and third sets of support arms includes first and second arm sections connected together for permitting said first arm section to be moved relative to said second arm section; and said at least one roll of each of said first, second, and third sets of support arms being carried by said second arm section of each of said first, second, and third sets of support arms.

10. The non-stop, large round baler, as defined in claim 9, wherein said first and second arm sections of each of said first, second, and third sets of support arms are pivotally connected together, and each of said three drive arrangements includes a motor coupled between the first and second arm sections of each arm of each of said first, second, and third sets of support arms.

11. The non-stop, large round baler, as defined in claim 1, wherein said first, second, and third sets of support arms are individually mounted for swinging about a horizontal, transverse axis; and said drive arrangement being operative for separately effecting individual swinging of said first, second, and third sets of support arms so as to individually adjust their respective rotational positions about said transverse axis.

12. The non-stop, large round baler, as defined in claim 11, and further including three position sensors respectively associated with said first, second, and third sets of support arms for determining their relative positions and for determining the size of a bale formed between them.

13. The non-stop, large round baler, as defined in claim 12, and further including an electronic control system coupled between said sensors and said drive arrangement.

14. The non-stop, large round baler, as defined in claim 1, wherein said chassis includes a pair of transversely spaced support members respectively located outside said side walls of said bale chamber; a horizontal transverse axle assembly coupling said pair of transversely spaced support members to a central location of said side walls to thereby support said side walls on said chassis; and said first, second, and third sets of support arms being individually mounted for swinging about said axle assembly.

15. The non-stop round baler, as defined in claim 14, and further including filler plates moveably mounted to a lower exterior location of each of said side walls.

16. The non-stop round baler, as defined in claim 11, wherein said filler plates are located in a path of movement of each of said first, second, and third sets of support arms; a filler plate control device connected to each filler plate; and a control system including a position sensor arrangement connected to said first, second, and third sets of support arms and said filler plate control device, whereby the positions of said filler plates is controlled in accordance to the positions occupied by said arms so that the latter do not interfere with the filler plates.

17. The non-stop, large round baler, as defined in claim 1, and further including a rocker arm pivotally coupled to an end of each arm of said first, second, and third sets of support arms at a location between first and second ends of the rocker arm; and said at least one roll which is carried by each of said first, second, and third sets of support arms, extending between, and being rotatably mounted to, said first end of each rocker arm; and a second roll extending between being rotatably mounted to said second end of each rocker arm.

18. The non-stop, large round baler, as defined in claim 1, wherein said crop gathering arrangement includes front and rear bottom conveyors mounted beneath the baling chamber, with the forward conveyor being inclined upwardly and forming a wedge with said first and second sections of said active flexible bale forming arrangement, respectively, when said baler is in said first and second bale starting conditions.

19. The non-stop, large round baler, as defined in claim 1, wherein said drive arrangement includes a guide track mounted to said chassis; each arm of said first, second, and third sets of support arms including a first section pivotally mounted to a second section, with the first sections of each set of arms supporting said at least one roll between first ends and having a follower at a second end located for being guided by said guide track, whereby movement of said at least one roller carried by each of said first, second, and third sets of support arms is controlled by said guide track.

20. The non-stop, large round baler, as defined in claim 1, wherein said crop gathering arrangement is mounted to said chassis for being selectively shifted fore-and-aft relative to said baling chamber so as to maintain said crop gathering arrangement positioned beneath said first expandable bale chamber as said first, second, and third arms are moved from said first starting condition to said intermediate condition, and so as to reposition said crop gathering arrangement so it is beneath said second expandable bale chamber when said first, second and third arms are moved from said intermediate condition to said second starting position.

* * * * *